(12) United States Patent
Patten

(10) Patent No.: US 9,630,225 B2
(45) Date of Patent: Apr. 25, 2017

(54) LONG TERM STORAGE OF WASTE USING ADSORPTION BY HIGH SURFACE AREA MATERIALS

(71) Applicant: Red Leaf Resources, Inc., South Jordan, UT (US)

(72) Inventor: James W Patten, South Jordan, UT (US)

(73) Assignee: Red Leaf Resources, Inc., Salt Lake City, UT (US)

(*) Notice: Subject to any disclaimer, the term of this patent is extended or adjusted under 35 U.S.C. 154(b) by 58 days.

(21) Appl. No.: 14/602,998

(22) Filed: Jan. 22, 2015

(65) Prior Publication Data

US 2015/0209847 A1 Jul. 30, 2015

Related U.S. Application Data

(60) Provisional application No. 61/932,582, filed on Jan. 28, 2014.

(51) Int. Cl.
 *B09B 1/00* (2006.01)
 *B09B 3/00* (2006.01)

(52) U.S. Cl.
 CPC .......... *B09B 3/0025* (2013.01); *B09B 3/0041* (2013.01)

(58) Field of Classification Search
 CPC .......... B09B 1/004; B09B 1/006; B09B 1/008
 See application file for complete search history.

(56) References Cited

U.S. PATENT DOCUMENTS

| | | |
|---|---|---|
| 3,274,784 A | 9/1966 | Gant et al. |
| 3,379,013 A | 4/1968 | Slagle et al. |
| 3,638,590 A | 2/1972 | Roberts et al. |
| 3,724,542 A * | 4/1973 | Hamilton ............... C02F 3/046 166/246 |
| 3,959,172 A | 5/1976 | Brownell et al. |
| 3,980,558 A | 9/1976 | Thompson |
| 4,116,705 A | 9/1978 | Chappell |

(Continued)

FOREIGN PATENT DOCUMENTS

| | | |
|---|---|---|
| FR | 2908675 A | 5/2008 |
| RU | 108034 U | 9/2011 |

OTHER PUBLICATIONS

REMPE, Permanent Underground Repositories for Radioactive Waste, Progress in Nuclear Energy 49 (2007) 365-374.

(Continued)

*Primary Examiner* — John Kreck
(74) *Attorney, Agent, or Firm* — Thorpe North & Western, LLP

(57) ABSTRACT

A system and method for long term storage of waste can include a comminuted material having a high surface area. The comminuted material can include particles of processed hydrocarbonaceous materials from which hydrocarbon products have been derived. The comminuted material can be contacted with a flowable waste material so that the flowable waste material is retained in the comminuted material. This flowable waste material is some material other than hydrocarbon products that have been derived from the hydrocarbonaceous materials. An encapsulation barrier can envelope the comminuted material and provide a secondary means of preventing escape of the flowable waste material.

28 Claims, 3 Drawing Sheets

(56) References Cited

U.S. PATENT DOCUMENTS

| | | | |
|---|---|---|---|
| 4,129,094 A * | 12/1978 | Stockel | A01K 1/0152 |
| | | | 119/171 |
| 4,464,081 A | 8/1984 | Hillier et al. | |
| 4,532,044 A * | 7/1985 | Fenton | C10G 25/003 |
| | | | 210/660 |
| 4,576,513 A | 3/1986 | Lindorfer et al. | |
| 4,608,126 A * | 8/1986 | Watson | C10B 53/06 |
| | | | 202/270 |
| 4,676,196 A * | 6/1987 | Lojek | A01K 1/0152 |
| | | | 119/171 |
| 4,908,129 A | 3/1990 | Finsterwalder et al. | |
| 5,302,565 A | 4/1994 | Crowe | |
| 5,325,816 A * | 7/1994 | Pattengill | A01K 1/0154 |
| | | | 119/173 |
| 5,366,520 A * | 11/1994 | Tiemeyer | B01D 17/0202 |
| | | | 210/502.1 |
| 5,645,518 A | 7/1997 | Wagh et al. | |
| 5,678,234 A | 10/1997 | Colombo et al. | |
| 5,840,638 A | 11/1998 | Cao et al. | |
| 6,004,070 A | 12/1999 | Van Camp | |
| 6,554,888 B1 * | 4/2003 | Chugh | B09B 1/008 |
| | | | 588/252 |
| 7,402,132 B2 | 7/2008 | Matthews | |
| 7,862,705 B2 | 1/2011 | Dana et al. | |
| 2011/0286796 A1 * | 11/2011 | Patten | B65G 5/00 |
| | | | 405/55 |

OTHER PUBLICATIONS

UNEP; Ministry of the Environment, Spain; Cleaner Production Regional Activity Center; Review of BATs and BEPs for the Hazardous Waste Treatment Sector in the Mediterranean Region, 2006.

* cited by examiner

LONG TERM STORAGE OF WASTE USING ADSORPTION BY HIGH SURFACE AREA MATERIALS

RELATED APPLICATION

This application claims priority to U.S. Provisional Application No. 61/932,582 filed Jan. 28, 2014 entitled "Long Term Storage of Waste Using Adsorption by High Surface Area Materials," which is incorporated herein by reference.

FIELD OF THE INVENTION

The present invention relates to systems and methods for long term storage of flowable waste such as hazardous waste in a body of high surface area material. Therefore, this invention relates generally to the fields of waste management, geology, materials science, and fluid mechanics.

BACKGROUND

Waste disposal is an increasingly challenging problem as more unwanted waste materials are generated throughout the world. Hazardous waste disposal in particular can involve complex and expensive measures to destroy or otherwise keep hazardous waste safely contained. If a disposal method does not sufficiently contain hazardous waste, the hazardous waste can escape into the surrounding environment and cause damage to plant and animal life, contaminate ground water, and may cause other damage. Measures are often taken to immobilize hazardous waste to prevent its escape into the environment. A wide variety of methods have been developed, including encasing waste in hardened materials such as cement, resin, or glass, injecting waste into fractures in underground rock formations, and storing waste in landfills that can be equipped with leak-resistant liners and detection systems. However, various challenges remain in terms of disposal site stability, permanence, reliability, and affordability, among others.

SUMMARY

A system for long term storage of waste can include a comminuted material having a high surface area. The comminuted material can include particles of processed hydrocarbonaceous materials from which hydrocarbon products have been derived. A flowable waste material can be retained in the comminuted material. This flowable waste material is a material other than hydrocarbon products that have been derived from the hydrocarbonaceous materials. An encapsulation barrier can envelope the comminuted material.

Additionally, a method for storing a flowable waste material can include contacting a substantially stationary body of a comminuted material with the flowable waste material. The comminuted material can have a high surface area. The comminuted material can also include particles of processed hydrocarbonaceous materials from which hydrocarbon products have been derived. Finally, the comminuted material can be enveloped by an encapsulation barrier.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
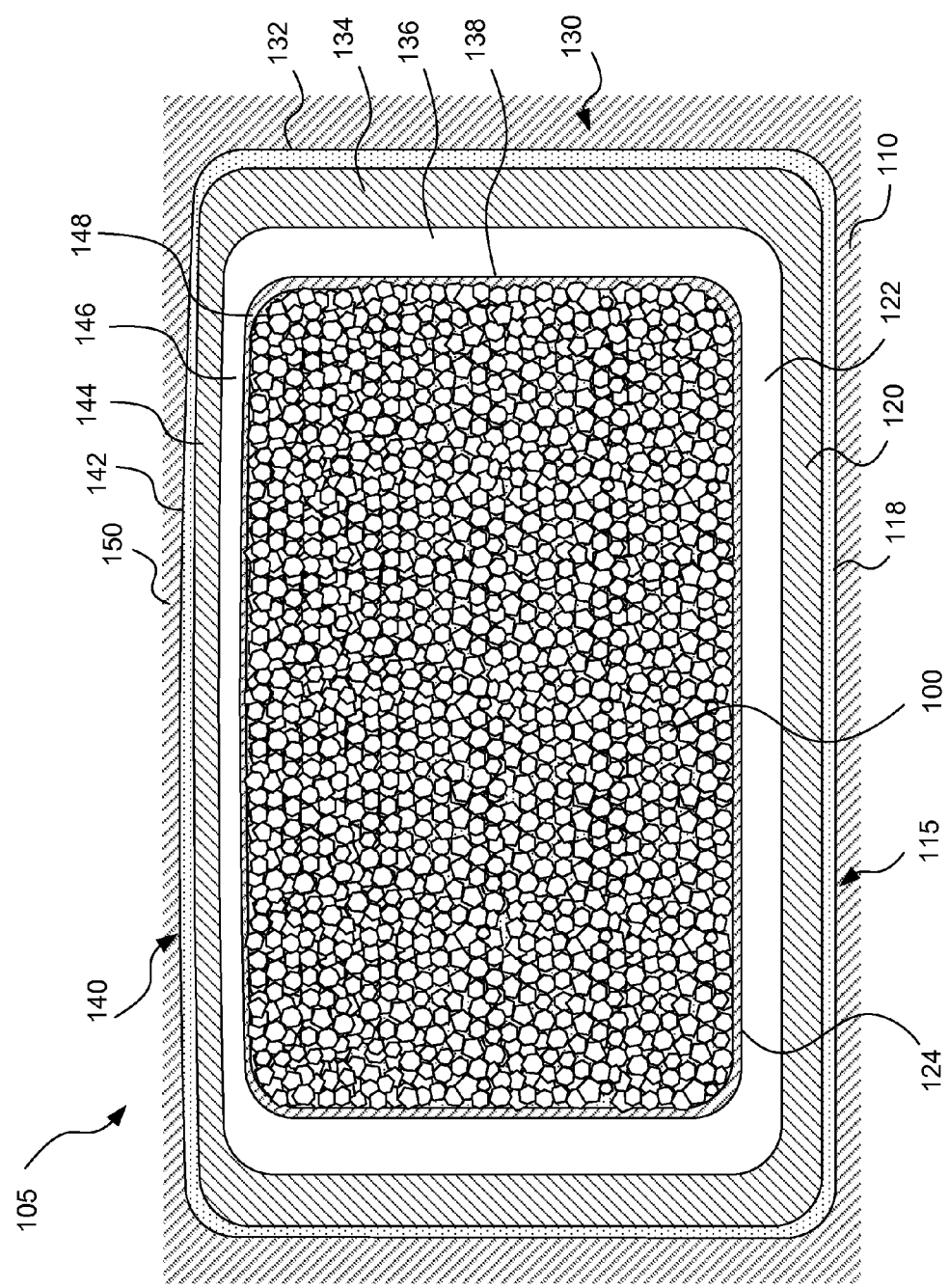
FIG. 1 is a cross section of a body of comminuted material enveloped by an encapsulation barrier in accordance with one embodiment of the present invention.

It should be noted that the figures are merely exemplary of several embodiments of the present invention and no limitations on the scope of the present invention are intended thereby. Further, the figures are generally not drawn to scale, but are drafted for purposes of convenience and clarity in illustrating various aspects of the invention.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used. The singular forms "a," "an," and "the" include plural references unless the context clearly dictates otherwise. Thus, for example, reference to "a wall" includes reference to one or more of such structures, "a waste material" includes reference to one or more of such materials, and "a contacting step" refers to one or more of such steps.

As used herein, "comminuted" refers to breaking a formation or larger mass into smaller pieces, e.g. typically fragments less than about 2 feet in diameter. A comminuted mass can be rubbilized or otherwise broken into fragments using any number of techniques including crushing, detonation, and the like.

As used herein, "earthen material" refers to natural materials which are recovered from the earth with only mechanical modifications such as, but not limited to, swelling clay (e.g. bentonite, montmorillonite, kaolinite, illite, chlorite, vermiculite, etc.), gravel, rock, compacted fill, soil, and the like. Gravel, for example, may be combined with cement to form concrete. Frequently, clay amended soil can be combined with water to form a hydrated layer which acts as a fluid barrier. In contrast, spent oil shale can be used in connection with the earthen material used in walls of an encapsulation barrier, but would not be an earthen material as used herein due to prior processing to convert embedded kerogen to hydrocarbon products.

As used herein, "flowable waste" refers to material which is capable of flowing into a high surface area material at given conditions. Flowable waste can include liquids, gases, particulate fines, vapors, or combinations thereof. As used herein, "hazardous material" or "hazardous waste" includes any material that can cause harm to animals, people or the environment and that exhibits one or more of the following characteristics: ignitability, reactivity, corrosivity, toxicity, or radioactivity. A number of hazardous wastes are defined by the Environmental Protection Agency in 40 C.F.R. 261 (Jul. 1, 2012). However, any materials which exhibit such characteristics to a degree which is unsuitable for a given application or environment can be considered hazardous. For example, hazardous materials can also include radioactive materials such as nuclear wastes or associated processing materials which are Class A, B or C type wastes.

As used herein, "hydrocarbonaceous material" refers to hydrocarbon-containing material from which hydrocarbon products can be extracted or derived. For example, hydrocarbons may be extracted directly as a liquid, removed via solvent extraction, directly vaporized or otherwise liberated from the material. However, many hydrocarbonaceous materials contain hydrocarbons, kerogen and/or bitumen which are converted to a higher quality hydrocarbon product including oil and gas products through heating and pyrolysis. Hydrocarbonaceous materials can include, but are not limited to, oil shale, tar sands, coal, lignite, bitumen, peat, biomass, and other organic rich rock. As used herein, "processed hydrocarbonaceous material" refers to hydrocarbon-containing material from which hydrocarbon products have been extracted or derived. For example, hydrocarbons may be extracted directly as a liquid, removed via solvent extraction, directly vaporized or otherwise removed from the material. However, many hydrocarbonaceous materials contain kerogen or bitumen which is converted to a hydrocarbon through heating and pyrolysis. Hydrocarbonaceous materials can include, but are not limited to, oil shale, tar sands, coal, lignite, bitumen, peat, biomass, and other organic rich rock. Such processed hydrocarbonaceous materials can optionally be mixed with other materials such as rock, cement, resins, other earthen materials, surfactants, binders, enzymes, biologically derived fillers, biological reagents, inorganic reagents, precursors, salts, and/or manmade materials.

As used herein, "mined" refers to a condition under which material which has been removed or disturbed from an original stratographic or geological location to a second and different location. Typically, mined material can be produced by rubbilizing, crushing, explosively detonating, or otherwise removing material from a native geologic formation for further use or processing.

As used herein, "retention capacity" refers to an amount of a flowable waste material that can be held substantially stationary within a body of comminuted material. The retention capacity can be dependent on many factors, such as the surface area of the comminuted material, porosity of the comminuted material, void space in the comminuted material, amount of residual hydrocarbons or other materials left in the comminuted material after processing, intermolecular forces between the flowable waste material and surfaces of the comminuted material, wettability of the comminuted material with respect to the flowable waste material, capillary forces, viscosity of the flowable waste material, surface tension of the flowable waste material, density of the flowable waste material, temperature, and other factors which contribute to a reduction in surface energy. Retention capacity is at least partially governed by a reduction in surface energy upon contact of the flowable waste with the body of comminuted material. Retention capacity can thus be a function of the interactions between and properties of the body of comminuted material and the flowable waste material, e.g. the retention capacity of a body of comminuted material can be different for different waste materials. Generally, the retention capacity can be the greatest amount of a flowable waste material that can be stably retained within the comminuted material without the waste material flowing out of the comminuted material or pooling at the bottom of the comminuted material under the force of gravity.

As used herein, "substantially stationary" refers to nearly stationary positioning of a flowable waste material within a comminuted material. This refers to the flowable waste material having substantially no bulk flow, with allowances for small-scale flowing such as flowing within pores, within wetting film layers around the comminuted material, random convective flow, or between adjacent particles of comminuted material. A substantially stationary flowable waste material can also undergo movements if the comminuted material settles or subsides within the encapsulating barrier. However, a substantially stationary flowable waste material will not undergo bulk flow, flow out of the body of comminuted material, or pool at the bottom of the comminuted material under the force of gravity.

As used herein, "about" refers to a degree of deviation based on experimental error typical for the particular property identified. The latitude provided by the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, and sub-ranges such as 10 to 50, 20 to 100, etc.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Any steps recited in any method or process claims may be executed in any order and are not limited to the order presented in the claims. Means-plus-function or step-plusfunction limitations will only be employed where for a specific claim limitation all of the following conditions are present in that limitation: a) "means for" or "step for" is expressly recited; and b) a corresponding function is expressly recited immediately following. The structure, material or acts that support the means-plus function are expressly recited in the description herein. Accordingly, the scope of the invention should be determined solely by the appended claims and their legal equivalents, rather than by the descriptions and examples given herein.

Long Term Storage of Wastes

A system for long term storage of wastes can generally operate by retaining a flowable waste material within a stationary body of comminuted material. The comminuted material can have a high surface area and can contain particles of processed hydro carbonaceous material from which hydrocarbon products have been derived. The waste materials can be any flowable hazardous or non-hazardous materials for which disposal by long term storage is desired. The comminuted material can have a retention capacity, which is an amount of flowable waste material that can be held substantially stationary within the comminuted material. The retention capacity can be dependent on many factors, such as the surface area of the comminuted material, porosity of the comminuted material, intermolecular forces between the flowable waste material and surfaces of the comminuted material, viscosity of the flowable waste material, surface tension of the flowable waste material, and others. Generally, the retention capacity can be the greatest amount of flowable waste material that can be stably retained within the comminuted material without the waste material flowing out of the comminuted material or pooling at the bottom of the comminuted material under the force of gravity. In addition, an encapsulation barrier can envelope the comminuted material. The encapsulation barrier can serve as a secondary measure to prevent escape of the waste material. In some embodiments, the encapsulation barrier can be completely impermeable to the waste material. In other cases, the encapsulation barrier can be partially impermeable to the waste material. Generally, a partially impermeable barrier can reduce diffusion of the waste material to less than 10% of a diffusion without the barrier, in some instances less than 5%, and in other cases less than 1%.

Figure 2:
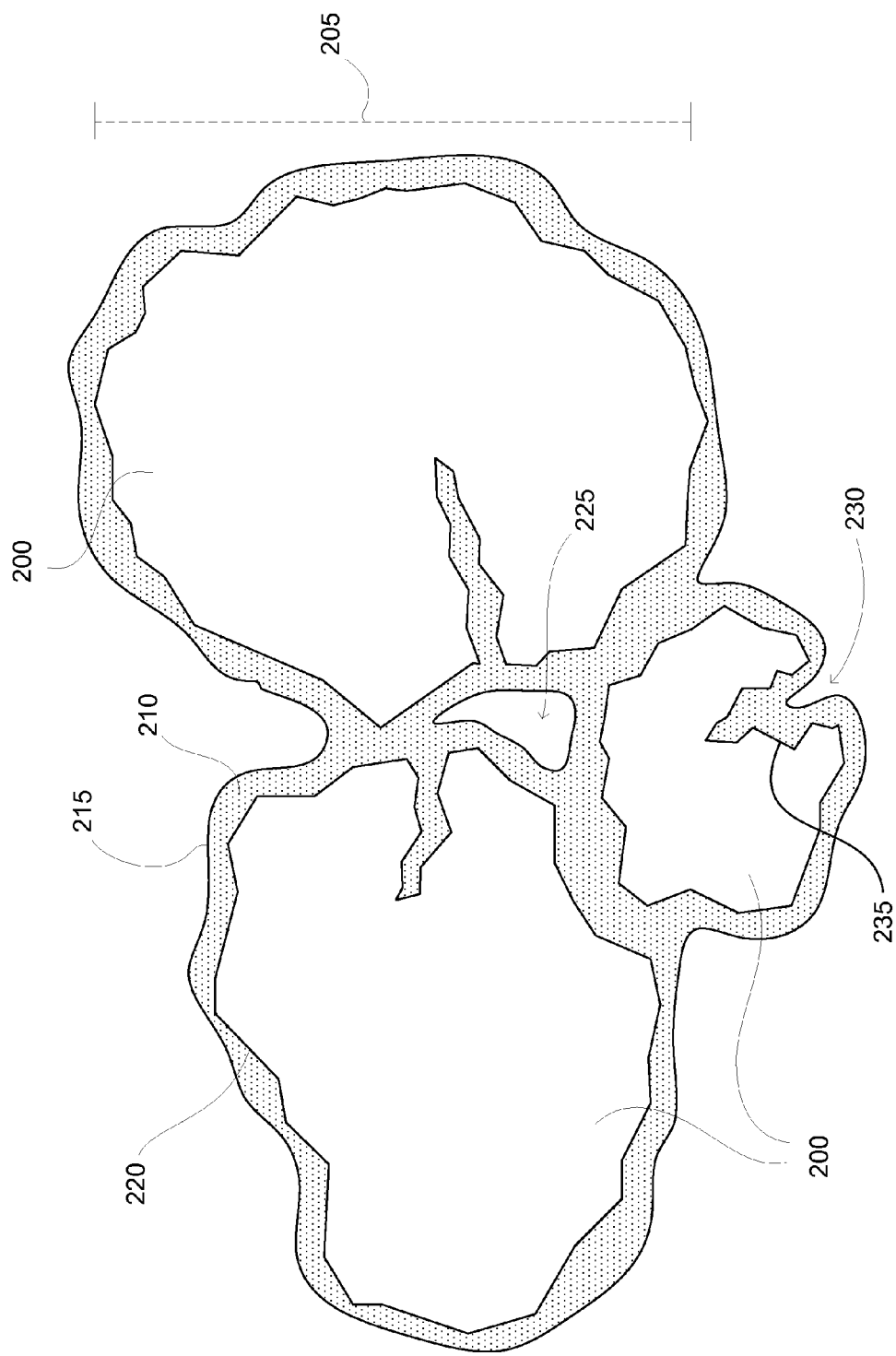
FIG. 2 is a cross section of particles of comminuted material with a flowable waste material retained therein in accordance with one embodiment of the present invention.

With the above in mind, a system for long term storage of wastes can include a body of comminuted material enveloped by an encapsulation barrier. Referring to FIG. 1, the system includes comminuted material 100 enveloped by an encapsulation barrier 105. The comminuted material can be fragments of a larger mass that has been rubbilized or otherwise broken, such as a rock formation that has been rubbilized. Particles of comminuted material can have a variety of sizes and shapes. As shown in FIG. 2, particles 200 of comminuted material can be irregularly shaped. Each particle has a longest dimension 205. The size of the particles can vary, but in some embodiments the majority of the particles by volume can have a longest dimension between about one millimeter (1 mm) and about thirty centimeters (30 cm). The size and shape of the particles can depend on the design of the system and the method used to crush the comminuted material. In some embodiments, the particles can have a wide distribution of longest dimensions, such as a random distribution of longest dimensions between about one millimeter and about thirty centimeters. In other embodiments, the longest dimension can be more uniform. Surface area of the comminuted material can be affected by the size and shape of the particles. For example, smaller particles can have a greater surface area than an equal volume of larger particles. As a general guideline, over 90% of the particles can have a low aspect ratio of less than 5:1, and in most cases less than 2:1. Furthermore, although not required, the particles can have non-uniform shape which also varies among the particles.

The comminuted material 100 can have a high surface area and can be generally very large in volume such that the system can retain a substantial volume of waste. For example, typical storage systems can be formed having a volume in excess of about 1000 $m^3$ to 1.6 million $m^3$. Dimensions for the system can range from about 10 m to 200 m in depth and 0.5 acre to 5 acres in plan surface area.

The comminuted material can have a high surface area. The surface area of the comminuted material can be a contributor to the retention capacity of the comminuted material. For example, a high surface area can result in a greater magnitude of surface tension and capillary forces between the comminuted material and the waste material. Waste material can adhere to the surfaces of the particles of comminuted material, thereby being retained in the body of comminuted material. As shown in FIG. 2, a flowable waste material 210 can adhere to particles 200 of comminuted material. The flowable waste material can form a film 215 on the surface 220 of the particles and also collect within voids between particles. The thickness of the film, and therefore the amount of waste material that can be retained, depends on several factors such as the surface tension, viscosity, and density of the waste material, and the shape, surface area, and wettability of the comminuted material with respect to the waste material. In some cases the film can be a wetting film, or in other words a stable film that results from the waste material wetting the surface of the comminuted material. Waste material can also be retained in interstitial spaces 225 between the particles.

The comminuted material can also typically be a porous material. Pores can increase the surface area of the comminuted material and can also increase the retention capacity by absorbing waste material into the pores. As shown in FIG. 2, particles 200 of comminuted material can have pores 230 which have exposed openings at the surface 220 of the particles. In some cases, the pores can have an interior volume that is completely filled with waste material 210. Thus waste material can be absorbed into the particles of comminuted material. In other cases, an interior surface 235 of the pores can be wetted by a film 215 of waste material without the waste material filling the interior volume of the pores.

High surface area and high porosity can both contribute to the retention capacity of the comminuted material. The retention capacity can be affected by many factors, including void space in the comminuted material, capillary forces, intermolecular forces, wettability of the comminuted material with respect to the waste material, surface area of the comminuted material, porosity of the comminuted material, temperature, viscosity of the waste material, density of the waste material, and others. The higher the retention capacity, the more waste material can be stored in the comminuted material. In some embodiments, the comminuted material can retain an amount of waste material equal to the retention capacity. In other embodiments, the comminuted material can contain less than the retention capacity of waste material such as within 20% of retention capacity and in some cases within 10%, and in other cases within 5% of the retention capacity. Storing an amount of waste material that is less than the retention capacity can provide a safety margin to ensure that waste material does not escape from the comminuted material. Since a system for long term storage of waste can be designed to retain waste material for a very long period of time, using a safety margin can help protect against the possibility of loss of waste material due to unusual conditions or events. Although a storage time can be determined by a particular application, the designed storage time can be at least 5 years, in some cases at least 20 years, and in yet other cases at least 100 years.

Although the comminuted material can normally retain an amount of waste material up to the retention capacity, waste material can conceivably escape if conditions change sufficiently, such as large changes in temperature, weather changes such as flooding or heavy rain, or shifting of the earth beneath or around the comminuted material, or changes in properties of the waste material. In these situations, storing less than the retention capacity can reduce the risk of escape of waste material. In some embodiments, the waste material is present at an amount less than about 90% of the retention capacity of the comminuted material. In other embodiments, the waste material is present at an amount less than about 70% of the retention capacity of the comminuted material, providing a wider safety margin. However, when using swelling clays as a barrier material, changes in ground water or hydration levels generally do not compromise the barrier properties of the system.

The comminuted material can include particles of processed hydrocarbonaceous materials from which hydrocarbon products have been derived. Spent hydrocarbonaceous materials can often have a very high surface area. For example, oil shale is a hydrocarbon-rich rock that can become highly porous after the hydrocarbons have been removed. Unprocessed oil shale contains kerogen, an organic material, bound to an inorganic matrix of mineral-rich materials. The kerogen can be found in thin layers and small pockets throughout the oil shale. After the kerogen is removed by pyrolysis, inorganic matrix is left behind with a network of pores at least partially previously occupied by the kerogen. Additionally, mechanical weaknesses formed in the oil shale during pyrolysis can form a network of cracks and voids that further increases porosity of the spent oil shale. In some embodiments, the processed hydrocarbonaceous material in the comminuted material can be spent oil shale, spent tar sands, coal residual, lignite residual, bitumen residual, or mixtures thereof. Processed hydrocarbonaceous material can be an unwanted residual product of hydrocarbon extraction operations. Therefore, using processed hydrocarbonaceous material in a system for long term storage of waste can provide a convenient means to dispose of a flowable waste and the unwanted processed hydrocarbonaceous material at the same time.

In some embodiments, the comminuted material can contain substantially only processed hydrocarbonaceous materials from which hydrocarbon products have been derived. However, in other embodiments, the comminuted material can include other optional materials. Low grade oil shale can be included in the comminuted material, for instance if the oil shale does not contain a sufficient amount of kerogen to make extraction profitable. In some embodiments the comminuted material can include other earthen materials such as clay, compacted fill, refractory cement, cement, swelling clay amended soil, compacted earth, low grade shale, and combinations thereof. However, materials which are not processed hydrocarbonaceous material can most often comprise less than 50% by volume and in some cases less than 10% by volume of the storage body including the processed hydrocarbonaceous material.

As previously discussed, the flowable waste material can be retained in the comminuted material. As a flowable material, the waste material can be pumped or poured into the body of comminuted material. In some embodiments, the waste material can be a liquid. A liquid waste material can be substantially only liquid or can contain solid particles to form a slurry or suspension. Furthermore, a liquid waste material can contain any type of liquid material. For example, a liquid waste material can contain a substantially pure liquid chemical, a mixture of multiple chemicals, and dissolved solids and gases. In another optional aspect, the flowable waste material can be a gas or flowable particulate. An example of flowable waste particulate can be calcined waste material, or particulate fines produced as a byproduct of a primary waste treatment process.

Flowable waste materials are able to flow into the comminuted material, allowing the flowable waste materials to form wetting films, to fill interstitial spaces, and to be absorbed into pores in the comminuted material or otherwise adsorbed on surfaces of the comminuted material. In some embodiments, the waste material can form a wetting film around the comminuted material. A wetting film is a stable film that results from the waste material wetting a surface of the comminuted material, and can be different thicknesses depending on the adhesive forces between the waste material and the comminuted material and other factors such as the surface tension of the waste material. As shown in FIG. 2, a film 215 of waste material 210 can substantially conform to the surface 220 of a particle 200 of comminuted material. The thickness of the film can be different in different locations depending on the geometry of the particle and proximity of other particles. Also, films around two adjacent particles can merge together and form a continuous region of waste material retained between the particles. In some embodiments, the waste material can form a wetting film around at least a majority of the comminuted material by volume. Even a thin wetting film can hold a large volume of waste material if the wetting film is formed around a majority of the high surface area comminuted material. In some cases waste material can fill interstitial spaces 225 between the particles, while in other cases the interstitial spaces can contain films of waste material and empty void space. Additionally, waste material can flow into pores 230 and fill the pores, thereby being absorbed into the particles of comminuted material.

The waste material can be retained in the comminuted material such that the waste material is substantially stationary. If the waste material is present in an amount equal to or less than the retention capacity of the comminuted material, then the waste material can be substantially stationary as it will be in the form of a wetting film, trapped in interstitial spaces, or absorbed in pores of the comminuted material. Accordingly, the waste material can be present in an amount such that the waste material will not flow out of the body of comminuted material under the force of gravity or pool at the bottom of the body of comminuted material. When the comminuted material and barrier material is an earthen or other natural material, stability and retention of the retained waste material can extend indefinitely. Thus, the retention systems described herein can effectively retain flowable waste as long as catastrophic damage to the barrier is avoided.

Hazardous wastes can be effectively disposed of by storage in a system in accordance with the present invention. Disposal of hazardous wastes can be challenging because of the potential for hazardous wastes to cause harm to people and the environment.

The systems of the present invention can retain a hazardous waste for long periods of time, and in most cases indefinitely, ensuring that the hazardous waste does not escape into the environment. Hazardous wastes can generally include dangerous materials that have one or more of the following properties which are in excess of desirable ranges: high ignitability, high reactivity, corrosivity, toxicity, and radioactivity. Temperature of the system can also affect stability or degree of danger for some hazardous wastes. Detailed definitions of these properties and lists of specific hazardous wastes have been published by the Environmental Protection Agency. Hazardous wastes suitable for storage using the present invention can include flowable hazardous waste materials identified in 40 C.F.R. 261 (Jul. 1, 2012), although other hazardous materials can also be stored. Other materials, such as radioactive materials, can also be hazardous wastes. In some embodiments of the present invention, the flowable waste material can be a hazardous material selected from the group consisting of radioactive waste, chemical waste, pesticides, automotive waste, solvents, caustics, heavy metal-containing waste, refrigerants, biological waste, biohazardous materials, immobilized biomaterials, and mixtures thereof. Specific non-limiting examples of hazardous material can include mercury, arsenic, cadmium, and the like.

The flowable waste material can generally be material other than residual hydrocarbon products or other process residuals left behind after deriving hydrocarbons from the hydrocarbonaceous materials. Although the goal of the hydrocarbon production process is to remove as much of the hydrocarbons as possible from the hydrocarbonaceous materials, there can be an amount of residual hydrocarbons left over in the spent hydrocarbonaceous materials after processing. The amount of residual hydrocarbons left behind can vary depending on various factors. For example, poor temperature control during the hydrocarbon production stage can result in less efficient hydrocarbon production and accordingly more residual hydrocarbons left behind. Even though these residual hydrocarbons can in some cases be flowable and can be considered waste because they are not recovered as a useful product, they are referred to in the present invention as residual recovery process materials and not flowable waste material. Herein, the term flowable waste material is reserved for waste material added to the comminuted material regardless of the properties of residual recovery process materials present within the comminuted material previous to introduction of flowable waste material.

Metals and other chemicals in oil shale can be examples of residual recovery process materials left behind in the processed hydrocarbonaceous materials during hydrocarbon recovery. Some of these residual recovery process materials can be considered hazardous. The flowable waste of the present invention can be some other material besides these left-behind metals and chemicals. Generally, the flowable waste material that is stored in the comminuted material can be a foreign material that was not originally present in the hydrocarbonaceous material (i.e. not a produced component). For example, the flowable waste material can be transported from a distant location to be stored in the comminuted material. The flowable waste material can also be produced from an on-site process that is outside the body of comminuted material, such as an on-site hydrocarbon refining plant. Thus, materials such as produced hydrocarbon products, produced carbon dioxide, or other products, including by-products, of the recovery processing are not considered flowable waste materials. In one alternative, the comminuted material can be used to trap and store residuals from extraction processes. Non-limiting examples of extraction processes can include cyanide leaching in gold or copper extraction, uranium extraction from spent shale, and the like. In these processes, the comminuted material can serve as an extraction volume where the extraction process is performed. Alternatively, the comminuted material can serve merely as a storage volume where residuals from a spatially distinct extraction process are placed subsequent to extraction.

Residual recovery process materials such as hydrocarbons, metals, and other chemicals that are left behind in the processed hydrocarbonaceous material can affect the retention capacity of the comminuted material. The comminuted material can have less exposed surface area because of adsorbed residual hydrocarbons, for example. In some cases residual hydrocarbons can clog pores and further reduce the retention capacity. Conversely, such residual hydrocarbons, carbon and other materials can increase favorable surface energies for capture of flowable waste and can thus reduce combined surface energy sufficient to improve adherence and retention capacity within the comminuted material. These factors can be taken into account when determining the retention capacity of the comminuted material to avoid overfilling the comminuted material with flowable waste.

The comminuted material can be enveloped by an optional encapsulation barrier to provide a supplemental barrier against egress of waste materials from the system. The encapsulation barrier can include a floor portion, a ceiling portion, and a sidewall portion connecting the floor and the ceiling to form an enclosed volume which contains the comminuted materials and which restricts flow of fluid outside the encapsulation barrier. In some embodiments the encapsulation barrier can have one or more fluid inlets and outlets. These fluid inlets and outlets can be used during the process of deriving hydrocarbon products from the hydrocarbonaceous materials within the encapsulation barrier, and also for introducing flowable waste materials into the comminuted material inside the encapsulation barrier. The ceiling portion defines an upper portion of the enclosed volume and is contiguous with the sidewall. The floor is also contiguous with the sidewall and can be substantially horizontal or sloped toward a drain as desired for the collection of hydrocarbon fluids extracted during processing of the hydrocarbonaceous materials. The collection drain can be closed or blocked before introduction of flowable waste material to prevent the escape of the waste material.

In some embodiments, the encapsulation barrier can be formed along walls of an excavated hydrocarbonaceous material deposit. For example, oil shale, tar sands, or coal can be mined from a deposit to form a cavity that corresponds approximately to a desired encapsulation volume for an encapsulation barrier. The excavated cavity can then be used as a support for the encapsulation barrier. In an alternative embodiment, a berm can be formed around the outside wall surface of the encapsulation barrier if the encapsulation barrier is partially or substantially above ground level. An encapsulation barrier can be a part of an above-ground, free-standing construction with berms supporting the side walls and the floor of the barrier being supported by the ground beneath the barrier.

The encapsulation barrier can be substantially free of undisturbed geological formations. Specifically, the encapsulation barrier can be completely constructed and manmade as a separate isolation mechanism for prevention of uncontrolled migration of waste material out of the comminuted material. Undisturbed geological formations can have cracks and pores that can make the formations permeable to flowable waste materials. Forming the encapsulation barrier as a completely man-made structure, without using undisturbed geological formations as the floor or walls, can reduce the risk of the waste materials seeping out through the geological formations. However, in some embodiments the encapsulation barrier can employ some elements of the surface of an excavated geological formation. For example, in some formations, the floor and walls of the excavation might have sufficiently low natural permeability that a distinct barrier layer such as a clay amended soil layer may not be necessary for portions of the barrier.

The encapsulation barrier can generally include a floor, a sidewall extending upwardly from the floor and a ceiling extending over the sidewall to define an enclosed volume. Each of the floor, sidewall and ceiling can be made up of a multiplicity of layers including an inner layer of fines or other insulation material and an outer layer of a swelling clay amended soil or similar fluid barrier material. Optionally, an outer membrane that further prevents passage of fluids outside the encapsulation barrier can be employed as a fluid barrier in addition to the swelling clay amended soil. The outer membrane can serve as a secondary back-up seal layer should the primary seal layer fail for any reason. An inner layer of high temperature asphalt or other fluid barrier material may also be optionally applied to the inner surface of the fines layer and define the inner surface of the encapsulation barrier.

Swelling clays are inorganic materials that can be hydrated, causing the clay to swell or otherwise create a barrier to fluid flow. The encapsulation barrier can be formed with particles of dry clay and other earthen materials, and then the clay can be hydrated to cause the clay particles to swell and create a barrier. Typically such a barrier layer can be formed of a solid phase of particles and a liquid phase of water which collectively form a substantially continuous fluid barrier. For example, the floor, walls, and ceiling of the encapsulation barrier can be formed using a swelling clay amended soil. When the swelling clay is hydrated, it swells and fills up the void spaces between particles of other materials in the soil. In this way the swelling clay amended soil becomes less permeable to the flowable waste material inside the encapsulation barrier. With a sufficient mixture of swelling clays and other earthen materials, the encapsulation barrier can be substantially impermeable to fluid flow. Some examples of suitable swelling clays include bentonite clay, montmorillonite, kaolinite, illite, chlorite, vermiculite, argillite, smectite, and others.

The combined multilayers forming the encapsulation barrier serve to insulate the comminuted material an that heat within the enclosed volume is retained to facilitate the removal of hydrocarbons from the oil shale, tar sands, or other hydrocarbonaceous material. The plasticity of the swelling clay amended soil layer seals the barrier to prevent leakage of waste material outside the barrier. The insulative properties of the fines layer are such that the temperature gradient across this layer allows the swelling clay amended soil layer to be cool enough to remain hydrated. During production of hydrocarbons from the hydrocarbonaceous materials, this prevents passage of hydrocarbons outside the barrier except via designated conduits. After storing a flowable waste material in the comminuted material, this can also prevent escape of waste material outside the barrier. However, consistent with the description herein, it can be desirable to fill the material with the flowable waste material at a volume which is below the retention capacity. Thus, pooling or localized collection of the waste material in excess of the retention capacity of the material within each region can be avoided so as to limit or entirely eliminate reliance on such exterior secondary barriers.

In certain situations, the insulative fines layer can be omitted from the encapsulation barrier. For example, if the comminuted material is being subjected to alternate processes that do not require the application or generation of heat, such as solvent extraction or leaching, in order to remove materials therefrom, the insulative layer is optional. In such embodiments, the enclosed volume containing the comminuted material is seated from the outside environment by the hydrated swelling clay amended soil layer. Appropriate impermeable membranes can optionally line the inner surface of the hydrated swelling clay amended soil layer. Although not always desirable, such an inner lining can prevent interaction between the hydrated swelling clay amended soil layer and solvents and/or leaching fluids that might otherwise react with or damage the hydrated swelling clay amended soil layer.

When utilized, the insulative layer can most often be formed of a fines layer. Typically, the fines layer can be a particulate material of less than 3 cm in diameter. Although other materials may be suitable, the fines layer can typically be made up of gravel, sand, crushed lean oil shale or other particulate fines that do not trap or otherwise inhibit fluid flow. By choosing appropriate particulate materials and layer thickness the fines layer can act as the principal source of insulation and can sustain a substantial thermal gradient from the inner to the outer surface. Gases can penetrate this permeable fines layer, but cannot substantially penetrate the encapsulating swelling clay layer. When the comminuted material is at a temperature greater than the inner surface of the encapsulating swelling clay layer, as is the case during the hydrocarbon extraction process, gases can cool sufficiently in the fines layer (below the condensation point of the corresponding gases), and liquids can condense from the gases. These liquids subsequently trickle down through the fines to the bottom of the encapsulation barrier, where they are collected and removed.

The encapsulation barrier can be formed using any suitable approach. However, in one aspect, the barrier is formed from the floor up. The formation of the wall or walls and filling of the enclosure with the comminuted material can be accomplished simultaneously in a vertical deposition process where materials are deposited in a predetermined pattern. For example, multiple chutes or other particulate delivery mechanisms can be oriented along corresponding locations above the deposited material. By selectively controlling the volume of particulate delivered and the location along the aerial view of the system where each respective particulate material is delivered, the layers and structure can be formed simultaneously from the floor to the ceiling. The sidewall portions of the barrier can be formed as a continuous upward extension at the outer perimeter of the floor and each layer present, including the swelling clay amended soil layer, fines layer, and, if present membrane and/or asphalt liner, are constructed as a continuous extension of the floor counterparts. During the building up of the sidewall, the comminuted material can be simultaneously placed on the floor and within the sidewall perimeter such that the volume that will become the enclosed space is being filled simultaneously with the rising of the constructed sidewall. In this manner, internal retaining walls or other lateral restraining considerations can be avoided. This approach can also be monitored during vertical build-up in order to verify that intermixing at interfaces of layers is within acceptable predetermined tolerances (e.g. to maintain functionality of the respective layer). For example, excessive intermingling of swelling clay amended soil with fines may compromise the sealing function of the swelling clay amended soil layer.

This can be avoided by careful deposition of each adjacent layer as it is built up and/or by increasing deposited layer thickness.

As the build-up process nears the upper portions, the ceiling can be formed using the same delivery mechanisms described above and merely adjusting the location and rate of deposition of the appropriate material forming the ceiling layer. For example, when the desired height of the sidewall is reached, a sufficient amount of the encapsulation barrier materials can be added to form a ceiling.

Regardless of the specific approach used to form the encapsulation barrier, the floor is generally first formed and can include placement of an optional outside membrane, a swelling clay amended soil layer and a fines layer. Optionally, an asphalt layer can be placed adjacent the inner surface of the fines layer. Depending on the particular installation, heating conduits, collection conduits, fluid delivery conduits, collection trays, and/or other structures can optionally be embedded into the deposited comminuted materials. The barrier as formed can also have overburden placed over the ceiling. If the barrier is to be formed below existing grade, a cavernous pit may be prepared by excavation or other suitable steps. If not located in a subterranean location, a soil or other supporting berm can surround the sidewall and support the layer materials as they are deposited.

With the above description in mind, FIG. 1 depicts a side view of one embodiment showing an encapsulation barrier 105 enveloping a comminuted material 100. An existing surface or excavated grade 110 is used primarily as support for the floor portion 115 of the barrier. The floor portion comprises an optional outer membrane 118, a swelling clay amended soil layer 120, an insulating fines layer 122 and, optionally, an inner asphalt layer 124. Building upward from the floor portion is a continuous sidewall portion 130 comprising an outer membrane 132, a swelling clay amended soil layer 134, a fines layer 136, and, optionally an inner asphalt layer 138. As previously noted, the various layers can be formed simultaneously from bottom to top as the barrier is constructed. Also, a comminuted material, such as oil shale, tar sands, coal and the like can be placed on the floor and fill what will become an enclosed volume as the walls are constructed. Depending on the placement of the system, the exterior surface of the sidewall portion and floor portion can be supported by a berm or, if excavated, the base and walls of an excavation. Each of the floor, walls, and ceiling 140 portions of the barrier collectively form the insulating and containing layers. Generally, these portions of the layers urea continuous layer surrounding the comminuted material.

Upon completion of sidewall portion 130, and whether filled simultaneously or separately, a comminuted material 100 is placed within what will become the enclosed volume. A ceiling 140 can be formed over the comminuted material and is contiguous with the sidewall portion. As with the floor and sidewall, the ceiling may have multiple layers including an optional outer membrane 142, a swelling clay amended soil layer 144, a fines layer 146, and optionally an inner asphalt layer 148. Overburden 150 can also cover the ceiling if desired. Also, material used as overburden can be used as a sidefill or floor to engulf or surround the barrier.

The various layers of the floor, sidewall and ceiling are continuous and in direct contact or communication with similar materials such that, for example, the fines layers, 122, 136 and 146 are one continuous layer surrounding the enclosed volume. The same holds true for the outer membrane layers 118, 132 and 142, the swelling clay amended soil layers 120, 134 and 144, and, if used, can also be true of the inner asphalt layers 124, 138 and 148. It is to be noted that the thickness of each layer may not be uniform throughout the barrier. It is the presence of the layer that is important and the thickness of each layer is not critical provided it is functional for its intended purpose, e.g. insulation, fluid barrier and the like. Although thickness of the encapsulating barrier can vary, suitable thicknesses can often range from about 4 cm to about 2 m.

A method of storing a flowable waste material can include contacting a substantially stationary body of a comminuted material with a flowable waste material. The comminuted material can have a high surface area to allow the comminuted material to have a high retention capacity. The comminuted material can include particles of processed hydrocarbonaceous materials from which hydrocarbon products have been derived. An encapsulation barrier can envelope the comminuted material.

The types of materials used in the method and their properties and characteristics can be the same as described above with respect to the system for storage of flowable wastes. The comminuted material can be of the same particle size, surface area, and materials as described above. Similarly, the flowable waste material used in the method can include all the flowable waste materials described above, including hazardous and non-hazardous wastes. The encapsulation barrier can also have the same materials, configurations, and methods of construction as described above.

In some embodiments, the step of contacting the substantially stationary body of comminuted material with the flowable waste material can include injecting the flowable waste material into the comminuted material. The injection can be performed by pumping the waste material through conduits from outside the encapsulation barrier to the inside. The conduits can in some cases be the same conduits that were used during the hydrocarbon production stage either to inject heating fluids or to remove hydrocarbon products. In other embodiments, the step of contacting the comminuted material with the waste material can be performed in other ways. The waste material can be mixed with the comminuted material before introducing the comminuted material into the encapsulation barrier. Regardless, introduction of the flowable waste material can be performed so as to minimize localized pooling or leaving excessive volumes void of waste material. Therefore, the flowable waste material can be distributed throughout the comminuted material to increase homogeneity and utilize storage capacity of the entire comminuted material body. This can be accomplished using multiple distribution inlets, existing embedded conduits, and/or monitoring of flowable waste material at various locations. Typically, introduction into the comminuted material can provide copious amounts of waste material in local excess of retention capacity. Accordingly, excess flowable waste material will flow into adjacent lower regions of the comminuted material upon reaching the local retention capacity. Monitoring of waste fluid levels and/or modeling of total volume capacity can be used to determine the volume of flowable waste material that can be introduced into a given volume of comminuted material while not exceeding the retention capacity of the entire volume.

Figure 3:
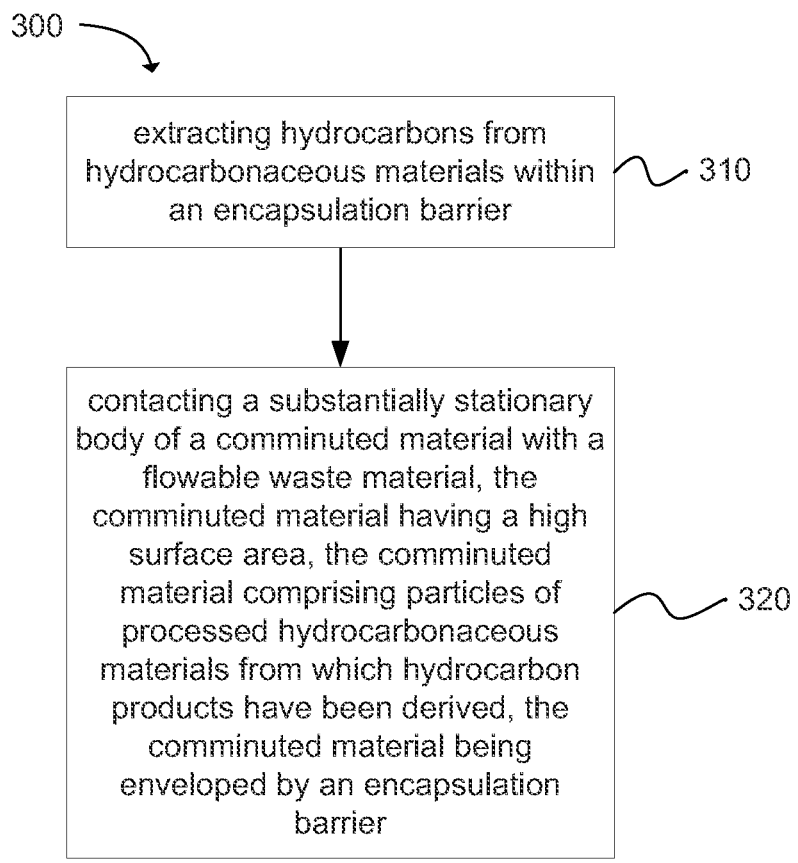
FIG. 3 is a flow chart of a method for storing a flowable waste material in accordance with one embodiment of the present invention.

The method can further include performing a hydrocarbon production stage to remove hydrocarbons from the comminuted material before the step of contacting the comminuted material with the flowable waste material. FIG. 3 shows an exemplary method 300 which includes extracting hydrocarbons from hydrocarbonaceous materials within an encapsulation barrier 310 and contacting a substantially stationary body of a comminuted material with a flowable waste material. As described above, the comminuted material has a high surface area and comprises particles of processed hydrocarbonaceous materials from which hydrocarbon products have been derived. The comminuted material is also enveloped by an encapsulation barrier 320.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A system for long term storage of waste, comprising:
   a) a comminuted material having a high surface area and having a flowable waste material retained therein, the comminuted material comprising particles of spent oil shale from which hydrocarbon products have been derived; and
   b) an encapsulation barrier which envelopes the comminuted material;
   wherein the waste material is not the hydrocarbon products, and
   wherein the flowable waste material is retained in the comminuted material for a storage time of at least 5 years.

2. The system of claim 1, wherein a majority of the particles by volume within the comminuted material have a longest dimension between about 1 mm and about 30 cm.

3. The system of claim 1, wherein the encapsulation barrier comprises earthen materials selected from the group consisting of clay, compacted fill, refractory cement, cement, clay amended soil, swelling clay, bentonite clay, montmorillonite, kaolinite, illite, chlorite, vermiculite, compacted earth, low grade shale, or combinations thereof.

4. The system of claim 1, wherein the encapsulation barrier includes swelling clay amended soil.

5. The system of claim 1, wherein the encapsulation barrier is free standing.

6. The system of claim 1, wherein the encapsulation barrier is supported by an undisturbed geological formation.

7. The system of claim 1, wherein the waste material is a hazardous waste.

8. The system of claim 7, wherein the waste material includes a material selected from the group consisting of radioactive waste, chemical waste, pesticides, automotive waste, solvents, caustics, heavy metal-containing waste, refrigerants, biological waste, biohazardous waste, extraction residuals, and mixtures thereof.

9. The system of claim 1, wherein the waste material comprises at least one of a liquid, a gas, and solid particulates.

10. The system of claim 1, wherein the waste material is a liquid.

11. The system of claim 1, wherein the waste material is retained in the comminuted material such that the waste material is substantially stationary.

12. The system of claim 1, wherein the waste material forms a wetting film around the comminuted material.

13. The system of claim 1, wherein the comminuted material is porous and the waste material is retained within the pores of the comminuted material.

14. The system of claim 1, wherein the waste material is present at an amount equal to or less than a retention capacity of the comminuted material.

15. The system of claim 1, wherein the comminuted material further comprises earthen materials selected from the group consisting of clay, compacted fill, refractory cement, cement, swelling clay amended soil, compacted earth, low grade shale, or combinations thereof.

16. A method of storing a flowable waste material comprising contacting a substantially stationary body of a comminuted material with a flowable waste material, the comminuted material having a high surface area, the comminuted material comprising particles of spent oil shale from which hydrocarbon products have been derived, the comminuted material being enveloped by an encapsulation barrier, and wherein the flowable waste material is retained in the comminuted material for a storage time of at least 5 years.

17. The method of claim 16, wherein a majority of particles by volume within the comminuted material have a longest dimension ranging from 1 mm to 30 cm.

18. The method of claim 16, wherein the encapsulation barrier comprises earthen materials selected from the group consisting of clay, compacted fill, refractory cement, cement, clay amended soil, swelling clay, bentonite clay, montmorillonite, kaolinite, illite, chlorite, vermiculite, compacted earth, low grade shale, or combinations thereof.

19. The method of claim 16, wherein the waste material is a hazardous material.

20. The method of claim 19, wherein the waste material includes a material selected from the group consisting of radioactive waste, chemical waste, pesticides, automotive waste, solvents, caustics, heavy metal-containing waste, refrigerants, biological waste, biohazardous waste, extraction residuals, and mixtures thereof.

21. The method of claim 16, wherein the waste material is a liquid.

22. The method of claim 16, wherein the waste material is retained in the comminuted material such that the waste material is substantially stationary.

23. The method of claim 16, wherein the waste material forms a wetting film around the comminuted material.

24. The method of claim 16, wherein the comminuted material is porous and the waste material is retained within the pores of the comminuted material.

25. The method of claim 16, wherein the waste material is present at an amount equal to or less than a retention capacity of the comminuted material.

26. The method of claim 16, wherein contacting comprises injecting the waste material into the comminuted material.

27. The method of claim 16, further comprising extracting hydrocarbon products from hydrocarbonaceous materials within the encapsulation barrier before contacting the comminuted material with the waste material, wherein a retention capacity of the hydrocarbonaceous materials is increased during the extracting.

28. The system of claim 1, wherein the system has a depth ranging from about 10 m to about 200 m and a plan surface area ranging from about 0.5 acres to about 5 acres.

* * * * *